US011124606B2

United States Patent
Treasurer et al.

(10) Patent No.: US 11,124,606 B2
(45) Date of Patent: Sep. 21, 2021

(54) FORMALDEHYDE FREE CROSSLINKING COMPOSITIONS

(71) Applicant: ALLNEX NETHERLANDS B.V., Bergen op Zoom (NL)

(72) Inventors: Urvee Y. Treasurer, Stamford, CT (US); Zachary Wilde, Acworth, GA (US); Lawrence Flood, Woodstock, GA (US); Sarah Quinn, Roswell, GA (US); Colin Brogan, Alpharetta, GA (US); Ram Gupta, Stamford, CT (US)

(73) Assignee: ALLNEX NETHERLANDS B.V., Bergen op Zoom (NL)

( * ) Notice: Subject to any disclaimer, the term of this patent is extended or adjusted under 35 U.S.C. 154(b) by 98 days.

(21) Appl. No.: 16/570,140

(22) Filed: Sep. 13, 2019

(65) Prior Publication Data

US 2020/0002475 A1     Jan. 2, 2020

Related U.S. Application Data

(63) Continuation of application No. 15/780,276, filed as application No. PCT/EP2016/082521 on Dec. 23, 2016, now Pat. No. 10,457,776, which is a continuation of application No. 14/984,155, filed on Dec. 30, 2015, now abandoned.

(51) Int. Cl.
| | | |
|---|---|---|
| *C08G 71/02* | (2006.01) | |
| *C09D 161/32* | (2006.01) | |
| *C09D 133/14* | (2006.01) | |
| *C08G 12/42* | (2006.01) | |
| *C08G 12/26* | (2006.01) | |
| *C09D 133/06* | (2006.01) | |

(52) U.S. Cl.
CPC ............. *C08G 71/02* (2013.01); *C08G 12/26* (2013.01); *C08G 12/424* (2013.01); *C09D 133/14* (2013.01); *C09D 161/32* (2013.01); *C09D 133/066* (2013.01)

(58) Field of Classification Search
CPC .......................... C08G 71/02; C09D 133/066
USPC ....................................................... 427/407.1
See application file for complete search history.

(56) References Cited

U.S. PATENT DOCUMENTS

| | | | |
|---|---|---|---|
| 4,284,758 A | | 8/1981 | North |
| 4,332,586 A | | 6/1982 | North |
| 4,455,416 A | * | 6/1984 | Floyd .................... D21H 19/62 |
| | | | 528/245 |
| 4,625,029 A | * | 11/1986 | Floyd ................... C08G 12/424 |
| | | | 544/309 |
| 8,133,952 B2 | | 3/2012 | Pisanova et al. |
| 2004/0092637 A1 | * | 5/2004 | McClanahan .......... G01J 3/463 |
| | | | 524/406 |
| 2006/0252855 A1 | * | 11/2006 | Pisanova .................. C08K 5/04 |
| | | | 524/47 |
| 2013/0189438 A1 | | 7/2013 | Gupta et al. |
| 2014/0243469 A1 | * | 8/2014 | Billiani .............. C09D 133/066 |
| | | | 524/555 |
| 2015/0080523 A1 | | 3/2015 | Gupta et al. |

FOREIGN PATENT DOCUMENTS

| | | |
|---|---|---|
| WO | 2012/044547 | 4/2012 |
| WO | 2012/044549 | 4/2012 |
| WO | 2013/142787 | 9/2013 |

OTHER PUBLICATIONS

International Search Report dated Mar. 3, 2017 in International Application No. PCT/EP2016/082521.

* cited by examiner

*Primary Examiner* — Hui H Chin
(74) *Attorney, Agent, or Firm* — Wenderoth, Lind & Ponack, L.L.P.

(57) ABSTRACT

The present invention relates to reaction products H of at least one cyclic urea U, at least one multifunctional aldehyde A and at least one polyol P, process for preparing thereof and compositions comprising thereof.

12 Claims, No Drawings

FORMALDEHYDE FREE CROSSLINKING COMPOSITIONS

TECHNICAL FIELD

The present invention is directed to a reaction product of a cyclic urea and a multifunctional aldehyde, and to a process for making the same. It is also directed to a coating composition comprising the said reaction product, and to a method of use of the said coating composition to provide a coating on a substrate.

BACKGROUND ART

Crosslinking agents or crosslinkers based on amino resins and coating compositions made with these are well known in the art and have been used for more than half a century in diverse applications including general industrial coatings, automotive coatings, coil coatings, powder coatings, baking enamels, and wood finishes. These crosslinking agents are based on reaction products of aldehydes, usually formaldehyde, with amine, amide, urethane or amidine compounds (together referred to as aminoplast formers) such as melamine, guanamines, urea, and substituted ureas. Among the major drawbacks of coatings based on these amino resins are formaldehyde emissions during cure.

Various crosslinking compositions have been developed that are based on combinations of aminoplast formers and aldehydes other than formaldehyde.

Formaldehyde free crosslinking resins for textile fabrics based on reaction products of cyclic ureas and multifunctional aldehydes having at least two aldehyde groups per molecule have been described in U.S. Pat. Nos. 4,332,586 and 4,284,758. Both US patents disclose preparation and use of alkylated glyoxal and cyclic urea condensates as crosslinkers for textile fabrics. However, the etherified adduct obtained showed a viscosity increase of about 4.6 fold upon storage for ten weeks at 48° C.

WO2012044547 and WO2012044549 describe respectively etherified and non-etherified reaction product of a cyclic urea and a multifunctional aldehyde.

WO2013142787 discloses hybrid resins or reaction products of cyclic alkylene urea with a multifunctional aldehyde and other "aminoplast formers". Examples of such aminoplast formers include linear and cyclic urea derivatives, amines, acid amine, urethanes, amino functional triazine derivatives, etc.

U.S. Pat. No. 8,133,952 describes the use of cyclic urea as a blocking agent of a product based on a use of polyvinyl-alcohol and a polyaldehyde crosslinker. This patent refers to a formaldehyde free curable aqueous composition for use as binder for non-woven products which requires the presence of a high molecular weight polyvinyl alcohol.

U.S. Pat. No. 4,625,029 discloses cyclic urea/glyoxal/polyol condensates for use as formaldehyde free crosslinking agent resins for cellulosic textile fabrics. The polyols used are for example ethylene glycol, diethylene glycol and the like.

However, despite numerous efforts made, there is still a need to develop formaldehyde free crosslinking compositions based on reaction products of cyclic alkyleneureas and multifunctional aldehydes which show satisfying properties especially with regard to the shelf stability and the heat-aged film color stability when using in coating composition.

Technical Problem

The object of the present invention is to provide crosslinking compositions based on reaction products of cyclic alkyleneureas and multifunctional aldehydes which release no or a very limited amount of formaldehyde when used in coating formulation, which show an improved shelf stability, preferably without the addition of any organic solvent and provide an improvement in heat-aged film color stability of the coating film.

General Description of the Invention

This object has been achieved by providing a reaction product H of at least one cyclic urea U, at least one multifunctional aldehyde A and at least one polyol P.

Indeed, it has been discovered that incorporation of at least one polyol P, preferably a short chain polyol like a diol, into a cyclic urea U-multifunctional aldehyde A condensate, as a co-reactant, surprisingly provides a crosslinking agent with improved shelf life, even without the use of a solvent, and further provides an improvement in heat-aged film color stability of the coating film, especially when prepared in the presence of an organic acid. Preferably, polyols P used are not vicinal polyols.

Another aspect of the invention is to provide a reaction product H of at least one cyclic urea U, at least one multifunctional aldehyde A and at least one polyol P which is obtained in presence of at least one acid catalyst C, preferably an organic acid catalyst. Indeed, it has been surprisingly found that the presence of an organic acid catalyst C, when preparing the reaction product H, allows further improving the shelf stability and heat aged film color stability of the coating compositions comprising the said reaction product H.

The process of preparation of the reaction product H according to the present invention preferably comprises the step of:

a) Mixing at least one cyclic urea U with at least one multifunctional aldehyde A in order to effect an addition reaction in the presence of at least one base B, which does not react with any of: —the multifunctional aldehyde A, —the cyclic urea U, and—the reaction product H, and at least one polyol P.

Another aspect of the invention concerns a coating composition comprising the reaction product H, and optionally at least one crosslinkable resin and/or optionally water and/or optionally at least one organic solvent, which crosslinkable resin may preferably be an oligomeric or polymeric material having at least one kind of functional groups having active hydrogen atoms, preferably selected from the group consisting of hydroxyl functional groups, acid functional groups, carboxylic acid functional groups, amide functional groups, amino functional groups, imino functional groups, imide functional groups, mercaptan functional groups, phosphine functional groups, and carbamate functional groups. According to an aspect of the invention, the coating composition comprises the reaction product H and at least one crosslinkable resin and optionally water and/or optionally at least one organic solvent.

It is one aspect of the invention to provide a waterborne coating composition comprising a mixture of the reaction product H, optionally at least one crosslinkable resin, and/or optionally water and/or optionally at least one organic solvent and/or optionally additives as known to those skilled in the art. According to one embodiment, the waterborne coating composition comprises a mixture of the reaction product H and at least one crosslinkable resin and/or optionally water and/or optionally at least one organic solvent and/or optionally additives.

Another aspect of the invention is to provide a method of use of the reaction product H as a crosslinker, in particular a method for coating, comprising admixing the reaction product H with optionally at least one crosslinkable resin and/or optionally with water and/or optionally with at least one organic solvent, homogenizing and applying the homogenized mixture to a substrate. According to one embodiment, the method of use of the reaction product H as a crosslinker, comprises admixing the reaction product H with at least one crosslinkable resin and/or optionally with water and/or optionally with at least one organic solvent homogenizing and applying the homogenized mixture to a substrate.

Description of Preferred Embodiments

The present invention proposes a reaction product H of at least one cyclic urea U, at least one multifunctional aldehyde A and at least one polyol P. The reaction product H is obtained from the reaction of at least one cyclic urea U, at least one multifunctional aldehyde A and at least one polyol P.

The preferred ratios of the amount of substance of the at least one multifunctional aldehyde A to the amount of substance of the at least one cyclic urea U for the preparation of the reaction product H are comprised within the range of between 0.8:1 and 1.4:1 molar equivalents and more preferably between 1.25:1 and 1.1:1 molar equivalents.

The preferred ratios of the amount of substance of the at least one polyol P to the amount of substance of the at least one cyclic urea U used in making reaction product H are comprised within the range of between 0.01:1 and 1:1 and more preferably between 0.1:1 and 0.6:1 molar equivalents.

According to one specific embodiment, the most preferred ratio of the amount of substance of the multifunctional aldehyde A to the amount of substance of the cyclic urea U to the amount of substance of the polyol P when preparing the reaction product H is: 1.18:1.00:0.40 molar equivalents.

The ratio of the amount of reacted or bound polyol P into the reaction product H to the amount of the cyclic urea U in the reaction product H is preferably at least 0.01 mol/mol, more preferably the ratio is between 0.05 and 1 mol/mol and most preferably the ratio is between 0.19 and 0.6 mol/mol. The amount of polyol P reacted into the reaction product H is measured as the ratio [n(-polyol P)/n(U)] of the amount of substance of bound polyol to the amount of substance [n(U)] of cyclic urea U chemically bound in the reaction product.

The reaction product H shows a low imino content or a low level of unreacted cyclic urea U and a low level of residual multifunctional aldehyde A even when using a high molar charge ratio of multifunctional aldehyde A to cyclic urea U (greater than 1.01).

The multifunctional aldehyde A obeying the formula OHC—R'—CHO where R' may be a direct bond or an aliphatic divalent radical which may be linear, branched or cyclic and may have from one to twenty carbon atoms, both these options for R' leading to a divalent aldehyde having exactly two —CHO groups, or an aliphatic divalent radical which may be linear, branched or cyclic and may have from one to twenty carbon atoms, and carries at least one additional aldehyde group —CHO, which latter option leads to trivalent or polyvalent aldehydes having at least three aldehyde groups.

"Multifunctional" is used to denote, in the context of this invention, a molecule having more than one functional group, preferably at least two aldehyde groups. Preferred aldehydes are divalent aliphatic aldehydes, particularly glyoxal, malonic dialdehyde, succinic dialdehyde, and glutaric dialdehyde. Especially preferred is glyoxal. It is also possible to use mixtures of these, preferably mixtures comprising a mass fraction of at least 50% of glyoxal, particularly preferred, at least 70% of glyoxal. Glyoxal may be used for this invention in aqueous solution, as anhydrous solid which has to be cooled as its melting temperature is 15° C., or in the form of its dimer or trimer, optionally in solid hydrated form as dihydrates, or in the form of its addition products with sulphites or hydrogen sulphites which decompose under acidic conditions. It has been found that when using aqueous glyoxal purified by methods known to those skilled in the art, both colour and stability of the reaction product with cyclic ureas are improved. Purification can be done by the usual processes such as use of activated carbon or by use of ion-exchange resins or by treatment with metal carbonates or continuous liquid-liquid countercurrent extraction.

The cyclic ureas U, which may be used according to the present invention, have at least one unsubstituted —CO—NH— group. The cyclic ureas U are preferably cyclic alkylene ureas. These cyclic ureas U are cycloaliphatic or bicycloaliphatic compounds having an element of the structure —NH—CO—NH— within a ring structure, the total number of ring atoms preferably being from 5 to 7 (ethylene urea, 1,2-propylene urea, 1,3-propylene urea, 1,4-butylene urea or tetramethylene urea). Particularly preferred is ethylene urea or a mixture comprising ethylene urea, especially a mixture comprising at least a mass fraction of 50% of ethylene urea. In the case of a bicyclic compound, the simplest structure is glycoluril or acetylene diurea. These cyclic ureas may be substituted, preferably by alkyl groups on the N- or C-atoms, or both, the alkyl residues preferably having from one to four carbon atoms. At least one of the nitrogen atoms must remain unsubstituted to enable reaction with the aldehyde functional molecule. Preferably, the at least one cyclic urea U is selected from the group U1 consisting of ethylene urea, 1,2 propylene urea, hydantoin also known as glycolyl urea, parabanic acid also known as oxalyl urea, and glycoluril, and from the group U2 consisting of the cyclic ureas U1 which additionally have at least one substituent R3 on at least one of the nitrogen or carbon atoms of the said cyclic ureas U1, with the proviso that at least one nitrogen atom is unsubstituted, and the substituent R3 is selected from the group consisting of linear, branched and cyclic alkyl groups having from 1 to 10 carbon atoms.

It has been found that when using purified cyclic ureas instead of commercially available qualities, e. g. commercial ethylene urea which has about 96% purity (the mass fraction of ethylene urea in one commercially available product is (96.0±0.5) %), both colour and stability of the reaction product with multifunctional aldehydes are improved. Purification can be done by the usual processes such as recrystallisation, extraction, adsorption and ion exchange reactions, distillation, or sublimation, or complexation, and preferably by melt crystallisation which latter process has the advantages of low energy consumption, high space-time yield, and consistently good quality. The cyclic alkylene ureas may also be generated in situ by the reaction of a compound which has two or more >NH groups with an at least difunctional aldehyde, such as by reacting a diamine or a diamide with a dialdehyde. An example is dihydroxyethyleneurea which is formed by reacting urea with glyoxal.

A particularly preferred combination of a cyclic urea U and a multifunctional aldehyde A is: glyoxal reacted with ethylene urea, and optionally, either glyoxal, or ethylene urea, or both, in mixture with other multifunctional aldehydes and/or other cyclic ureas.

The at least one polyol P refers to a multihydroxy functional compound, having at least two hydroxy groups and can be chosen from a wide variety of linear and non-linear diols, triols, tetrols, compounds including ethylene glycol, diethylene glycol, 1, 3 propylene glycol, 1, 2 propylene glycol, butanediol, hexanediol, 2-methyl-1,3-propanediol (MP diol), 2-ethyl-1,2-hydroxymethyl-1,3-propanediol, Trimethylol propane (TMP), Tris (hydroxymethyl) ethane (THME), Cyclohexanedimethanol (CHDM), Neopentyl glycol (NPG), Trimethylpentanediol, Dimethylolpropionic acid (DMPA), Pentaerythritol and the like, and any mixtures thereof. The polyols used in this invention are preferably not based on derivatives of starch or cellulose or high molecular weight polyvinyl alcohol.

Polyols with molecular weight less than or equal to 1000 Daltons are preferred. Particularly preferred are polyols with molecular weight less than or equal to 500 Daltons and having at least two or more primary hydroxy functional groups. Other functional groups such as carboxylic acid group, amide group, carbamate, etc. may optionally be present in the preferred polyol with at least two primary hydroxy functional groups.

The at least two primary hydroxy functional groups in the polyol P are preferably non-vicinal and are separated by at least one carbon atom which may be primary, secondary or tertiary in nature.

Suitable polyols P are in particular hexanediol, 2-methyl-1,3-propanediol (MP diol), 2-ethyl-1,2-hydroxymethyl-1,3-propanediol, Trimethylol propane (TMP), Tris (hydroxymethyl) ethane (THME), Cyclohexanedimethanol (CHDM), Neopentyl glycol (NPG), Trimethylpentanediol, Dimethylolpropionic acid (DMPA), Pentaerythritol and the like and any mixtures thereof.

According to one specific embodiment, the at least one polyol P is selected from the group consisting of: 2-methyl-1,3-propanediol (MP diol), 2-ethyl-1,2-hydroxymethyl-1,3-propanediol, Trimethylol propane (TMP) and 1,6 hexanediol and any mixtures thereof.

The particularly preferred polyol is 2-methyl-1,3-propanediol (for example MP Diol®Glycol, from Lyondellbasell company) having a non-linear structure with two primary hydroxy groups.

According to a specific embodiment of the invention, the reaction product H is obtained from the reaction of at least one multifunctional aldehyde A, at least one cyclic urea U and at least one polyol P which is selected from the group consisting of: 2-methyl-1,3-propanediol (MP diol), 2-ethyl-1,2-hydroxymethyl-1,3-propanediol, Trimethylol propane (TMP) and 1,6 hexanediol, preferably 2-methyl-1,3-propanediol (MP diol). The reaction product H may be preferably obtained from the reaction of ethylene urea, glyoxal and 2-methyl-1,3-propanediol (MP diol).

The reaction product H may also be obtained in the presence of an acid catalyst C and preferably an organic acid catalyst. In fact, it has been surprisingly found that the use of an organic acid catalyst C for the preparation of the reaction product H results with a higher conversion, i.e. a higher amount of reacted polyol P. This leads to the formation of a reaction product H showing excellent performance and which displays improved shelf stability and improved film color stability in surface coating applications.

According to one embodiment, the reaction product H is obtained by reacting at least one cyclic urea U, at least one multifunctional aldehyde A and at least one polyol P in the presence of at least one acid catalyst C, preferably at least one organic acid catalyst, and most preferably citric acid. A preferred combination is a reaction product H of at least one cyclic urea U, at least one multifunctional aldehyde A and at least one 2-methyl-1,3-propanediol (MP diol) in the presence of citric acid. A most preferred combination refers to a reaction product H of at least one ethylene urea, at least one glyoxal and at least one 2-methyl-1,3-propanediol (MP diol) in the presence of citric acid.

The preferred organic acid catalysts C are: citric acid, succinic acid, lactic acid, tartaric acid and any mixtures thereof. The most preferred organic acid catalyst C is citric acid.

When an acid catalyst C, preferably an organic acid catalyst, is used for preparing the reaction product H, the ratio of the acid catalyst C to the cyclic urea U may preferably be comprised in the range of 0.0001 to 0.1 moles acid catalyst C per mole of cyclic urea U. Typically, 0.005 moles of acid catalyst C per mole of cyclic urea U. The amount of acid catalyst C added in the mixture should allow to achieve a pH of the reaction mixture which is <5, preferably a pH is <4 and more preferably a pH which is comprised within the range between 2.9 and 3.6.

The reaction product H may be either etherified or non-etherified. Preferably, the reaction product H is non-etherified.

A hydroxyl group (—OH) bonded to a carbonyl carbon atom of an aldehyde molecule, is generated in the addition reaction of the at least one cyclic urea U and the at least one multifunctional aldehyde A during the process of making the reaction product H. This hydroxyl group (—OH) can be further condensed or reacted with a mono-functional alcohol R—OH containing primary or secondary hydroxy functional group, where R is a $C_1$-$C_{12}$ alkyl group, such as for example methanol, ethanol, iso-propanol, n-butanol.

This reaction of the hydroxyl group (—OH) in the reaction product H with a mono-functional alcohol, R—OH, leads to the formation of an alkoxy group (—OR) in the reaction product H.

The degree of etherification is measured as the ratio [n(-OR)/n(U)] of the amount of substance [n(-OR)] of alkoxy groups as substituents of the aldehyde carbon atoms of the multifunctional aldehyde A chemically bound in the multifunctional aldehyde A-cyclic urea U condensate to the amount of substance [n(U)] of cyclic urea U chemically bound in the reaction product H.

"Etherified" means that the reaction product H is further condensed or reacted with at least one mono-functional alcohol R—OH containing primary or secondary hydroxyl functional groups such as for examples $C_1$-$C_{12}$ alcohols or mixtures thereof. Preferred $C_1$-$C_{12}$ alcohols are methanol, ethanol, iso-propanol, n-butanol or any mixtures thereof. The reaction product H may either fully etherified or partially etherified. Etherification using methanol, ethanol, iso-propyl alcohol or mixtures of methanol and ethanol or mixtures of methanol and isopropyl alcohol or mixtures of methanol, ethanol and isopropyl alcohol will provide cross-linking compositions which are water miscible and thus suited for waterborne coating applications. Etherification using n-butanol or mixtures of n-butanol and methanol will provide crosslinking compositions which are less water miscible and thus suited for solventborne coating application. As to the etherified product, the degree of etherification is superior or equal to 0.01 mol/mol.

"Non-etherified" stands for the product which is not further condensed or reacted with a mono-functional alcohol R—OH containing primary or secondary hydroxy functional groups such as for example methanol, ethanol, iso-propanol, n-butanol, etc. . . . . . As a result the reaction product H does not contain any alkoxy group (—OR). For the non-etherified product of this invention, the degree of etherification corresponding to the previous described ratio, is less than 0.01 mol/mol and preferably is 0.00 mol/mol.

The present invention also refers to a process for preparing the reaction product H comprising the step of:
 a) Mixing at least one cyclic urea U with at least one multifunctional aldehyde A in order to effect an addition reaction in the presence of at least one base B, which does not react with any of the multifunctional aldehyde A, the cyclic urea U, and the reaction product H, and at least one polyol P.

The at least one base B is preferably a common alkali hydroxide such as NaOH, KOH, NH$_4$OH and a variety of tertiary amines, such as triethyl amine, triisopropyl amine, dimethyl ethanol amine, methyl diethanol amine and the like. The at least one base B is added in an amount to achieve a pH at the end of step a) or during the step a) which is >5 and more preferably which is >6. The at least one base B may be added in an amount to achieve a pH at the end of step a) which is comprised from 5.0 to 8.0, preferably from 5.5 to 7.5, and more preferably which is comprised from 6.1 to 6.4.

The reaction mixture of step a), when including admixing the at least one polyol P as well, may be heated to a temperature from 21° C. to 80° C. and more preferably from 30° C. to 55° C. and most preferably from 35° C. to 50° C.

The reaction time of step a), when including admixing the at least one polyol P as well, may be preferably comprised from 0.5 hours to 8 hours and more preferably from 1 hours to 4 hours.

During the process for preparing the reaction product H, an addition reaction is effected between the at least one cyclic urea U and the at least one multifunctional aldehyde A. According to one embodiment, the addition reaction may be conducted in a pH range of more than 7.5 which is referred to as "basic" medium, or in a range of from 4.5 to 7.5 which is referred to a "weakly acidic to neutral" medium, and also in a pH range of less than 4.5 which is referred to as "acidic" medium. The formed condensate or oligomer chain then reacts with the at least one polyol P which results in the incorporation of the at least one polyol P inside and onto the backbone of the condensates or oligomer chain of the at least one cyclic urea U and the at least one multifunctional aldehyde A. The reaction of the at least one polyol P can be enhanced by using a more acidic medium and therefore is optionally preferably performed in the presence of an acid catalyst C, preferably an organic acid catalyst. At the end of the reaction of the at least one polyol P with the condensates of the multifunctional aldehydes A and the cyclic ureas U, the reaction product H is obtained.

The multifunctional aldehyde A and the cyclic urea U and the polyol P may preferably mixed according to the following ratio for preparing the reaction product H:
 the ratio of the amount of substance of the multifunctional aldehyde A to the amount of substance of the cyclic urea U for the preparation of the reaction product H is preferably comprised within the range of between 0.8:1 and 1.4:1 molar equivalents and more preferably between 1.25:1 and 1.1:1 molar equivalents.
 the ratio of the amount of substance of the polyol P to the amount of substance of the cyclic urea U may preferably be comprised within the range of between 0.01:1 and 1:1 and more preferably between 0.1:1 and 0.6:1 molar equivalents.

According to one specific embodiment, the most preferred ratio of the amount of substance of the multifunctional A to the amount of substance of the cyclic urea U to the amount of substance of the polyol P is: 1.18:1.00:0.40.

The reaction product H obtained at the end of the process shows a ratio of the amount of the at least one bound (or reacted) polyol P to the amount of the at least one cyclic urea U which is preferably at least 0.01 mol/mol, more preferably the ratio is between 0.05 and 1 mol/mol and most preferably the ratio is between 0.19 and 0.6 mol/mol.

The at least one polyol P refers to a multihydroxy functional compound, having at least two hydroxy groups and can be chosen from a wide variety of linear and non-linear diols, triols, tetrols, compounds including ethylene glycol, diethylene glycol, 1, 3 propylene glycol, 1, 2 propylene glycol, butanediol, hexanediol, 2-methyl-1,3-propanediol (MP diol), 2-ethyl-1,2-hydroxymethyl-1,3-propanediol, Trimethylol propane (TMP), Tris (hydroxymethyl) ethane (THME), Cyclohexanedimethanol (CHDM), Neopentyl glycol (NPG), Trimethylpentanediol, Dimethylolpropionic acid (DMPA), Pentaerythritol and the like. Suitable polyols P are in particular hexanediol, 2-methyl-1,3-propanediol (MP diol), 2-ethyl-1,2-hydroxymethyl-1,3-propanediol, Trimethylol propane (TMP), Tris (hydroxymethyl) ethane (THME), Cyclohexanedimethanol (CHDM), Neopentyl glycol (NPG), Trimethylpentanediol, Dimethylolpropionic acid (DMPA), Pentaerythritol and the like.

Preferred polyols P are selected in the group consisting of the polyol P having at least two primary hydroxy groups and is selected in the group consisting of: 2-methyl-1,3-propanediol (MP diol), 2-ethyl-1,2-hydroxymethyl-1,3-propanediol, Trimethylol propane (TMP) and 1,6 hexanediol and more preferably the at least one polyol P is: 2-methyl-1,3-propanediol (MP diol).

The preferred acid catalysts C are organic acid catalysts which may be selected from the group consisting of: citric acid, succinic acid, lactic acid, tartaric acid and any mixtures thereof. The most preferred organic acid catalyst C is citric acid.

According to a specific embodiment of the process, the at least one polyol P is admixed in a subsequent step b). In this case, the process for preparing the product H comprises the following steps:
 a) Mixing at least one cyclic urea U with at least one multifunctional aldehyde A in order to effect an addition reaction in the presence of at least one base B, which does not react with any of the multifunctional aldehyde A, the cyclic urea U, and the reaction product H,
 b) Admixing at least one polyol P.

It means that the at least one polyol P may be admixed either together with the multifunctional aldehyde A and the cyclic urea U in the presence of the at least one base B or may be admixed in a subsequent step b).

When the at least one polyol P is not added in the step a) but in the subsequent step b), the mixture of step a) may preferably be heated to from 21° C. to less than 80° C. and more preferably from 35° C. to 50° C.

Then, step b) consisting of the reaction with the at least one polyol P, may preferably be carried out at a temperature between 25° C. and 100° C., and more preferably between 40° C. and 55° C. Step b) is preferably conducted for a period of time which is comprised between 1 hour and 8 hours and more preferably for about 4 hours.

According to a specific embodiment, the process for preparing the reaction product H may also comprise:
 admixing at least one acid catalyst C, preferably an organic acid catalyst.

Preferably, when used, the acid catalyst C may be admixed in step b) together with the at least one polyol P. When the at least one polyol P is admixed to the at least one multifunctional aldehyde A and the cyclic urea U in step a), the at least one acid catalyst C may be admixed in a subsequent step b').

A variant of the process for preparing the reaction product H comprises the steps of:
a) Mixing at least one cyclic urea U with at least one multifunctional aldehyde A in order to effect an addition reaction in the presence of at least one base B, which does not react with any of the multifunctional aldehyde A, the cyclic urea U, and the reaction product H,
b) Admixing at least one polyol P and at least one acid catalyst C, preferably an organic acid catalyst.

Another variant of the process for preparing the reaction product H comprises the steps of:
a) Mixing at least one cyclic urea U with at least one multifunctional aldehyde A in order to effect an addition reaction in the presence of at least one base B, which does not react with any of the multifunctional aldehyde A, the cyclic urea U, and the reaction product H and at least one polyol P,
b') admixing at least one acid catalyst C, preferably an organic acid catalyst.

The at least one acid catalyst C, preferably organic acid catalyst, is added in such amounts that the ratio of the acid catalyst C to the cyclic urea U may be preferably comprised in the range of 0.0001 to 0.1 moles acid catalyst C per mole of cyclic urea U. Typically, 0.005 moles of the at least one acid catalyst C per mole of cyclic urea U. The pH obtained at the end of step b) or b') may preferably be <5, more preferably <4 and most preferably comprised between 2.9 and 3.6.

According to one embodiment, there may be a holding time which is comprised from 5 minutes to 4 hours between the steps a) and b) or between the steps a) and b').

According to a specific embodiment, water may be added or removed from the mixture obtained in step a). In particular, the water may preferably be removed by distillation.

The process may also comprise an additional step c) of admixing an inorganic base at the end of the reaction of the at least one polyol P, generally after about 4 hours of reaction. In this case, the inorganic base is added in such amount to increase the pH of mixture comprising the reaction product H to above 5 and more preferably to above 6. This inorganic base may preferably be selected from the group consisting of: a common alkali hydroxide such as NaOH, KOH, $NH_4OH$ and a variety of tertiary amines, such as triethyl amine, triisopropyl amine, dimethyl ethanol amine, methyl diethanol amine and the like.

According to one specific embodiment, the process for preparing the reaction product H may include an optional etherification step d). The etherification step d) consists of:
—adding at least one mono-functional alcohol R—OH and etherifying under acid conditions. The etherification step is performed in the presence of an acid catalyst AC. The acid catalyst AC may be selected in the group consisting of: nitric acid, sulfuric acid, hydrochloric acid, phosphoric acid and the like and any mixture thereof. The etherification step d) is carried out under a pH which is comprised from 5.0 to 1.5 and more preferably from 3.0 to 2.0.

The etherification step may be repeated once or more. These repeated etherification steps may be done by simply adding further alcohol, and optionally, further acid catalyst AC, to the reaction mixture, and continuing the reaction, or the reaction mixture after one etherification step may be cooled, neutralised, the unreacted alcohol, and optionally water, be removed, and then, further alcohol and acid catalyst AC may be added for the following etherification step. When the etherification step is repeated, the etherification step may be conducted with the same mono-functional alcohol or with a different one. The at least one mono-functional alcohol may preferably be selected from the group consisting of: $C_1$-$C_{12}$ and preferably $C_1$-$C_6$ alcohols or any mixtures thereof. Preferred $C_1$-$C_6$ alcohols are methanol, ethanol, iso-propanol, n-butanol or any mixtures thereof.

According to a specific embodiment, the process may optionally include an additional step e) of adding or removing water from the mixture comprising the reaction product H. The water removed during distillation may optionally be replaced, in full or part, by an organic solvent. When such a solvent is used, the solvent is a hydrophilic in nature. Examples of such solvents include glycol ethers and the like including but not limited to methoxy propanol. Step e) may be performed in order to adjust the solid contents.

The process may also include an optional step f) of cooling the reaction mixture comprising the reaction product H. Step f) may be for example performed by removing the heat source or applying external cooling conditions or any other method known to those skilled in the art.

The reaction product H may be isolated by an optional step g) of centrifugation or filtration to remove any solid residue; filtration can be done using simple filter media or filter media embedded with activated carbon.

Any of the previous mentioned optional steps c) to g) may be implemented singly or in any combination in the process according to the invention.

The reaction product H may be used as a crosslinker in a crosslinking composition, typically a formaldehyde free crosslinker.

The reaction product H may be used as a crosslinker in a crosslinking composition as a sole crosslinker or in combination with at least one additional crosslinker (X). When used in combination with an additional crosslinker (X), reaction product H is preferably used with amino resin crosslinkers.

When using such mixtures of reaction products H and at least one additional crosslinkers (X), the ratio of the mass m(H) of the reaction product H to the mass m(X) or to the sum m(X tot) of the masses of all crosslinkers (X) in the mixture in the case that more than one of these crosslinkers (X) is used, is from 1/99 to 99/1, preferably from 10/90 to 90/10, and particularly preferred, from 30/70 to 70/30. The masses m as used herein always stand for the mass of the active ingredient, and not the mass of a solution containing the active ingredient, if not expressly indicated otherwise.

The at least one crosslinker (X) may be selected from the group consisting of:
(X1) reaction products of an aminotriazine and at least one aldehyde selected from the group consisting of aliphatic monoaldehydes and multifunctional aliphatic aldehydes n having the structure Y(CHO), where Y is an n-functional aliphatic residue, and n is greater than 1,
(X2) reaction products of urea and/or cyclic ureas and aliphatic monoaldehydes,
(X3) reaction products of urea and/or cyclic ureas and aliphatic dialdehydes,
(X4) alkoxycarbonylaminotriazines, and/or
(X5) reaction products of phenols and aliphatic monoaldehydes.

The crosslinker comprising the reaction product H, optionally in combination with at least one of the crosslinkers (X1) to (X5), may be applied as such preferably to heat-sensitive substrates selected from the group consisting of paper, textiles, wood, fabricated wood, leather, or cellulosic materials, for which purpose they may be mixed with at least one of catalysts, fillers, wetting agents, solvents, and diluents, and applied to the substrate.

The present invention also refers to a method of use of the reaction product H, optionally in combination with at least one of the crosslinkers (X1) to (X5), as a crosslinker comprising applying the reaction product H to a substrate. The method of use of the reaction product H, optionally in combination with at least one of the crosslinkers (X1) to (X5), as a crosslinker comprises preferably admixing the reaction product H with optionally at least one crosslinkable resin and/or optionally with water and/or optionally with at least one organic solvent, homogenizing and applying the homogenized mixture to a substrate. According to a preferred embodiment, the method of use of the reaction product H, optionally in combination with at least one of the crosslinkers (X1) to (X5), as a crosslinker, comprises admixing the reaction product H with at least one crosslinkable resin homogenizing and applying the homogenized mixture to a substrate. Water and/or at least one organic solvent may be included if desired.

The substrate may be preferably selected from the group consisting of plastics including thermoplastics and thermosets, wood, fabricated wood, ceramics and glass, fabricated wood, leather, textiles, tyre cord, rubber objects, paper, cardboard, plaster, concrete, metal, metallised circuit boards, semiconductor surfaces, displays, and packagings for electronic circuitry.

The reaction product H, optionally in combination with at least one of the crosslinkers (X1) to (X5), may be combined as a crosslinker with waterborne and/or with solventborne polymeric crosslinkable resins (binder resins) having active hydrogen functionality or active hydrogen atoms, i. e. at least one of hydroxyl groups, acid groups, preferably carboxyl groups, carbamate groups, amide groups, imide groups, amino groups, imino groups, mercaptan groups, or phosphine groups or acid groups which may be carboxylic or derived from other organically bound acids.

As crosslinkers comprising the products H, when adequately catalysed, are active already at ambient temperature (20° C. to 25° C.), they are particularly useful to cure coatings on heat sensitive substrates, such as paper, cardboard, textiles, leather, wood, fabricated wood, and also plastics including composite materials, thermoplastics, and thermosets. They also work, of course, as crosslinkers for coating compositions that are used on substrates such as metals, semiconductor surfaces, ceramics, stone, plaster, glass, and concrete which allow higher curing temperatures. Application of said crosslinker in combination with the binder resins mentioned supra together with an appropriate catalyst CB can also be considered where cure temperature or energy savings are an issue.

Suitable catalysts CB are preferably acid catalysts, particularly those selected from the group consisting of organic sulphonic acids, organic phosphonic acids, organic sulphonimides, organic carboxylic acids and Lewis acids, or salts or complexes of Lewis acids such as amine salts or ether complexes or inorganic acids such as boric acid which is a monobasic Lewis acid of boron. Useful catalysts CB are para-toluene sulphonic acid (pTSA), dodecylbenzene sulphonic (DDBSA), dinonylnaphthalene sulphonic acid (DNNSA), and dinonyl naphthalene disulphonic acid (DNNDSA), which may also be blocked with volatile amines, boric acid used alone or as a mixture with other acid catalysts. Particularly preferred are N-methylsulphonyl-p-toluenesulphonamide (MTSI), para-toluene sulphonic acid (pTSA), dodecylbenzenesulphonic (DDBSA), dinonylnaphthalene sulphonic acid (DNNSA), and dinonyl naphthalene disulphonic acid (DNNDSA). Blocked acid catalysts where the acid is liberated e. g. by heating can, of course, also be used, such as acid esters or reaction products of acids and epoxide functional compounds. Particularly useful catalysts CB are acid catalysts, such as para-toluene sulphonic acid, or dinonyl naphthalene disulphonic acid, or boric acid which are usually dissolved in alcohol or in water.

In particular, the present invention also refers to a coating composition comprising the reaction product H and optionally at least one crosslinkable resin (or binder resin) and/or optionally water and/or optionally at least one organic solvent. According to a preferred embodiment, the coating composition comprises the reaction product H and at least one crosslinkable resin (or binder resin). Water and/or at least one organic solvent may be included as well. The coating composition may preferably be a curable coating composition. Usually, the curable coating composition may be cured under the effect of an acid catalyst CB which catalyzes the reaction between crosslinker and crosslinkable resin at ambient or higher temperatures.

The crosslinkable resin may be preferably an oligomeric or polymeric material having at least one kind of functional groups having active hydrogen atoms, selected from the group consisting of hydroxyl functional groups, acid functional group, carboxylic acid functional groups, amide functional groups, amino functional groups, imino functional groups, imide functional groups, mercaptan functional groups, phosphine functional groups, and carbamate functional groups.

Suitable active hydrogen-containing materials include, for example, polyfunctional hydroxy group containing materials such as polyols, hydroxyfunctional acrylic resins having pendant or terminal hydroxy functionalities, hydroxyfunctional polyester resins having pendant or terminal hydroxy functionalities, hydroxyfunctional polyurethane prepolymers, products derived from the reaction of epoxy compounds with an amine, and mixtures thereof. Acrylic and polyester resins are preferred. Examples of the polyfunctional hydroxy group containing materials include commercially available materials such as DURAMAC® 203-1385 alkyd resin (Eastman Chemical Co.); Beckosol® 12035 alkyd resin (Reichhold Chemical Co.), JONCRYL® 500 acrylic resin (S. C. Johnson & Sons, Racine, Wis.); AT-400 acrylic resin (Rohm & Haas, Philadelphia, Pa.); CARGILL® 3000 and 5776 polyester resins (Cargill, Minneapolis, Minn.); K-FLEX® XM-2302 and XM-2306 resins (King Industries, Norwalk, Conn.); CHEMPOL® 11-1369 resin (Cook Composites and Polymers, Port Washington, Wis.); CRYLCOAT® 3494 solid hydroxy terminated polyester resin (Cytec Industries Inc., Woodland Park, N.J.); RUCOTE® 101 polyester resin (Ruco Polymer, Hicksville, N.Y.); JONCRYL® SCX-800-A and SCX-800-B hydroxyfunctional solid acrylic resins (S. C. Johnson & Sons, Racine, Wis.).

Examples of carboxyfunctional resins include CRYLCOAT® solid carboxy terminated polyester resin (Cytec Industries Inc., Woodland Park, N.J.). Suitable resins containing amino, amido, carbamate or mercaptan groups, including groups convertible thereto, are in general well-known to those of ordinary skill in the art and may be prepared by known methods including copolymerising a suitably functionalised monomer with a comonomer capable of copolymerising therewith.

Usual additives such as organic solvents, coalescing agents, defoamers, levelling agents, fillers, pigments, light stabilisers, antioxydants, colourants, flow control agents, sag control agents, antiskinning agents, antisettling agents, adhesion promoters, wetting agents, preservatives, plasticisers, mould release agents, and corrosion inhibitors can, of course, be used in coating compositions comprising the crosslinkers of the present invention.

Suitable organic solvents include aromatic hydrocarbons, aliphatic hydrocarbons, halogenated hydrocarbons, ketones, esters, ethers, amides, alcohols, water, compounds having a plurality of functional groups such as those having an ether and an ester group, and mixtures thereof.

Coating compositions may preferably be prepared by admixing the reaction product H as crosslinker to a crosslinkable resin, which is a polymeric or an oligomeric resin having active hydrogen atoms, i. e. at least one of hydroxyl groups, acid groups, preferably carboxyl groups, carbamate groups, amide groups, imide groups, amino groups, imino groups, mercaptan groups, or phosphine groups. The resulting mixture is homogenized, and applied to a substrate by spraying, brushing, wire coating, curtain coating, blade coating, roll coating, dipping, electrophoretic deposition, powder spraying, or electrostatic spraying. The method for preparing coating compositions may include admixing water and/or at least one organic solvent.

The ratio of mass of solids of the crosslinkable resin to the mass of the reaction product H in the coating composition is preferably from 99/1 to 1/99, particularly preferably from 95/5 to 60/40, and most preferred, from 90/10 to 70/30.

According to one embodiment of the invention, the coating composition is a waterborne coating composition and more preferably a waterborne curable coating composition.

The waterborne curable coating composition may permit formation of a dispersion, emulsion, invert emulsion, or solution of the ingredients of the curable composition. According to a preferred embodiment, the waterborne curable coating composition comprises the reaction product H and at least one crosslinkable resin (or binder resin) and optionally water and/or optionally at least one organic solvent. The waterborne curable coating composition may optionally contain a surfactant, an emulsifying agent, a dispersant, an additive or any mixtures thereof.

The mass fraction of total solids present in the waterborne curable coating composition is usually from about 1% to about 60%, preferably from about 10% to about 55%, and more preferred, from about 25% to about 50%, based on the total mass of the composition.

The mass ratio of active hydrogen-containing material to crosslinker reaction product H present in the waterborne curable coating composition is usually from about 99:1 to about 1:1, preferably from 95:5 to about 60:40, and more preferred, from about 90:10 to about 70:30.

The ratio of the mass of surfactant present in the waterborne curable coating composition to the mass of the total active hydrogen-containing material in the composition is usually from about 0% to about 10%, preferably from about 0.1% to about 5%, and more preferred, from about 0.5% to about 2.0%.

The solvent components in the waterborne curable coating composition are solvents such as water and an optional co-solvent. Examples of such optional co-solvents are solvents mentioned hereinabove, to the extent that they are water-soluble or water-miscible in the amount used. Preferred co-solvents for the waterborne composition are alcohols and glycol ethers. The amount of co-solvent that may be preferably used is expressed as the ratio of the mass of cosolvent to the sum of the masses of the active hydrogen-containing material and of the crosslinker reaction product H in the waterborne curable composition of from 0% to about 30%, more preferably, from about 2% to about 25%, and particularly preferred, from about 5% to about 15%.

Surfactants, emulsifying agents and/or dispersants that may be used in the waterborne curable coating composition are molecules which have a hydrophobic portion (Y) and a hydrophilic portion (Z). They may have any of the molecular structure (Y)-(Z), (Y)-(Z)-(Y), (Z)-(Y)-(Z), etc., where a hyphen indicates a chemical bond between a moiety (Y) and a moiety (Z). Typically, the hydrophobic moiety can be an alkyl or an alkaryl residue, a poly(propylene-oxy) block, polydimethylsiloxane block or a fluorocarbon block. The hydrophilic moiety of a non-ionic surfactant is a water soluble non-ionic block, typically a poly(ethylene-oxy) block or a hydroxylated polymer block. The hydrophilic moiety of an anionic surfactant is typically an acid group converted to an anionic group by addition of a base. Typical acid groups are carboxylic acids, sulphonic acids, phosphonic acids and phosphoric acids which form carboxylate ions, sulphonate ions, phosphonate ions and phosphate ions. Typical bases used to ionise the acids are NaOH, KOH, $NH_4OH$ and a variety of tertiary amines, such as triethyl amine, triisopropyl amine, dimethyl ethanol amine, methyl diethanol amine and the like.

The anionic surfactants that may be used in the waterborne curable coating composition include, for example, salts of fatty acids, sulphuric acid esters or sulphonates of higher alcohols preferably having from eight to eighteen carbon atoms and alkali metal salts thereof, alkylbenzene sulphonates, alkyl naphthalene sulphonates, a condensation product of naphthalene sulphonic acid and formalin, dialkylsulphone succinates, alkyl phosphates, and poly(oxyethylene) sulphates. Particularly preferred are, for example, fatty acid salts such as potassium oleate, and a higher alcohol sulphuric acid ester salt such as sodium lauryl sulfate.

The cationic surfactants that may be used in the waterborne curable coating composition include, for example, alkylamine salts, quaternary ammonium salts, and poly(oxyethylene) alkylamines. Particularly preferred are quaternary ammonium salts such as lauryl trimethyl ammonium chloride or cetyltrimethyl ammonium chloride.

Amphoteric surfactants that may be used in the waterborne curable coating composition include alkylbetaines such as laurylbetaine and stearylbetaine.

The non-ionic surfactants that may be used in the waterborne curable coating composition include, for example, poly(oxyethylene)alkyl ethers, poly(oxyethylene) alkylphenol ether, fatty acid esters of sugar alcohols or derivatives thereof such as sorbitan (mixture of dehydration products of sorbitol), poly(oxyethylene) sorbitan fatty acid ester such as poly(oxyethylene) sorbitan monolaurate or monostearate, a polyoxyethylene acryl ester, an (oxyethylene-oxypropylene) block copolymer and a fatty acid monoglyceride.

Particularly preferred active hydrogen containing-materials useful for waterborne curable coating compositions are hydroxyfunctional acrylic resins having an acid number of between 3 mg/g and 20 mg/g and a hydroxyl number of between 20 mg/g and 150 mg/g, and a mass fraction of solids of between 40% and 55%, such as RoShield® 1024 emulsion (DOW), Macrynal® SM 6826w/43WA (Allnex).

Especially preferred resins useful for waterborne curable coating compositions are hydroxy functional acrylic resins with sulphonic acid groups incorporated in the polymer. In particular, the hydroxy functional acrylic resins with pendant sulphonic acid groups incorporated in the polymer may be those described in US2014/0243469 A1 and each of which are incorporated herein by reference in their entirety.

According to one embodiment of the invention, the coating composition is a solventborne coating composition and more preferably a solventborne curable coating composition.

A preferred variant is a coating composition which is a solventborne curable coating composition comprising a crosslinkable resin which is an oligomeric or polymeric material the functional groups of which are hydroxyl groups, and the polymeric or oligomeric material is selected from the group consisting of acrylic resins, polyester resins, alkyd resins, polyurethane resins, epoxy resins, vinyl resins, polyether polyols, characterised in that the polymeric or oligomeric material has a hydroxyl number of from 5 mg/g to 300 mg/g.

The coating compositions of this invention may preferably be employed as coatings in the general areas of coatings such as original equipment manufacturing (OEM) including automotive coatings, general industrial coatings including industrial maintenance coatings, architectural coatings, agricultural and construction equipment coatings (ACE), powder coatings, coil coatings, can coatings, wood coatings, and low temperature cure automotive refinish coatings. They are usable as coatings for wire, appliances, automotive parts, furniture, pipes, machinery, and the like. They can also be used in electronic applications, including coatings for metallised circuit boards, semiconductor surfaces, displays, and packaging for electronic circuitry.

The coating compositions can be applied by any of the known techniques such as spraying, dipping, brushing, wire coating, curtain coating, and using a doctor blade. If formulated as solids, they may also be used as crosslinkers in powder coating compositions, and may be applied by the usual methods such as electrostatic spraying, or powder spraying.

All the embodiments previously mentioned may be individually implemented or may be combined within reason.

The invention is now further described in more details in the following examples, which in no way intend to limit the invention or its applications.

EXAMPLES

All concentrations (strengths) and ratios stated in "%" are mass fractions (ratio of the mass mB of a specific substance B, divided by the mass m of the mixture, in the case of a concentration, or by the mass mD of the second substance D, in the case of a ratio). The acid number is defined, according to DIN EN ISO 3682 (DIN 53 402), as the ratio of that mass mKOH of potassium hydroxide which is needed to neutralise the sample under examination, and the mass mB of this sample, or the mass of the solids in the sample in the case of a solution or dispersion; its customary unit is "mg/g". The hydroxyl number is defined according to DIN EN ISO 4629 (DIN 53 240) as the ratio of the mass of potassium hydroxide mKOH having the same number of hydroxyl groups as the sample, and the mass mB of that sample (mass of solids in the sample for solutions or dispersions); the customary unit is "mg/g". Dynamic viscosities were measured on the Gardner-Holt scale and converted to SI units (mPa·s). GO stands for glyoxal, and EU for ethylene urea. n is the symbol for the physical quantity "amount of substance" with the SI unit "mol". M is the symbol for the physical quantity "molar mass" with the SI unit "kg/mol".

C-NMR analyses have been done with a Bruker-Oxford 13 Avance II 400 NMR spectrometer with a 100 mm probe. Samples were prepared by diluting the reaction products with approximately the same mass of dimethyl sulphoxide-d6.

Measurement of molar mass of the reaction products was done by HPSEC, or gel permeation chromatography, using tetrahydrofuran or dimethylacetamide as solvent, at a sample concentration of 1 g/100 ml, a flow of 1.0 ml/min, a column temperature of 65/C, and refractometric detection, using a set of crosslinked polystyrene bead filled columns having a particle diameter of 10 μm, with pore sizes of 10 nm (3×), providing a measuring range of from 100 g/mol to 50 kg/mol, for calibration with polystyrene standards. Data collection and analysis was made with software provided by Agilent Technologies.

Example 1: Ethanedial, Resin with 2-imidazolidinone and 2-Methyl-propane-1,3-diol (GO (glyoxal):EU (ethylene urea):Polyol molar ratio=1.16:1.00:0.46), polyol being 2-methyl-1,3-propanediol (MP diol).

A resin according to the invention was prepared by the following procedure:

169.7 parts (1.17 moles) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 8%) to 6.2. 185.5 parts (1.01 moles) of ethylene urea (MW 86, 2-imidazolidinone solution, with a mass fraction of solute of 46.9%) were added at ambient temperature over a period of 15-30 minutes. The reaction mixture was heated to 25° C. and a mild exotherm to 35-40° C. was observed. The temperature was raised to 45-50° C. and held for one and one half hours. At the end of this time period, 41.75 parts (0.46 moles) of 2-methyl-1,3-propanediol (MP diol) were added to the reaction vessel. The reaction mixture was held at 50° C. for one and one half hours. At the end of the hold, excess water was removed slowly at reaction temperature and under reduced pressure (600 mm Hg ramped to 220 mm Hg) until a mass fraction of solids of approximately 61% was achieved. The heat was turned off and the reaction mixture was allowed to cool to ambient. A straw yellow solution of the product was isolated in the amount of 320 grams. The product with a dynamic viscosity of approximately 627 mPa·s and a mass fraction of solids of 61.50% was obtained.

The amount of reacted MP diol and molar mass of the resulting straw yellow crosslinker solution were determined by C-13 NMR to be (n(-diol)/n(EU)=0.15 mol/mol; "EU" stands for ethylene urea; the amount of unreacted MP diol to be (n(-diol)/n(EU)=0.34 mol/mol; and the molar mass was determined by HPSEC (Mn=1572 g/mol, Mn stands for the number average molar mass) analyses.

The product of this example remained fluid under ambient storage temperature for about 15 days or more and was fluid for less than 8 days when held at 50° C.

The product of example 1 when evaluated in ambient and low bake heat cured waterborne surface coating applications resulted in coating films with good appearance, satisfactory resistance properties and superior formulation stability.

Example 2: Ethanedial, Resin with 2-imidazolidinone and 2-Methyl-propane-1,3-diol (GO:EU:MP diol molar ratio=1.17:1.0:0.47)

A resin according to the invention was prepared by the following procedure:

616.2 parts (4.25 moles) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 8%) to 6.2. 732.9 parts (3.62 moles) of ethylene urea (MW 86, 2-imidazolidinone solution, with a mass fraction of solute of 42.5%) were added at ambient temperature over a period of 15-30 minutes. The reaction mixture was heated to 25° C. and a mild exotherm to 35-40° C. was observed. The temperature was raised to 45-50° C. and held for one hour. At the end of this time period, 152.14 parts (1.69 moles) of 2-methyl-1,3-propanediol were added to the reaction vessel, followed by 3.43 parts (0.0179 moles) of citric acid. The pH was measured to be in the range of 3.1-3.6. The reaction mixture was held at 50° C. for four hours under stirring. At the end of four hours the pH was adjusted to ~6.0-6.5 using aqueous sodium hydroxide solution (with a mass fraction of solids of 25%). The heat was turned off and the reaction mixture was allowed to cool to ambient and filtered. A straw yellow solution of the product was isolated in the amount of 1520 grams. The product with a dynamic viscosity of approximately 100 mPa·s and a mass fraction of solids of 48.0% was obtained.

The amount of reacted MP diol and molar mass of the resulting yellow crosslinker solution were determined by C-13 NMR to be (n(-diol)/n(EU)=0.27 mol/mol; "EU" stands for ethylene urea; the amount of unreacted MP diol to be (n(-diol)/n(EU)=0.22 mol/mol; and the molar mass was determined by HPSEC (Mn=1377 g/mol, Mn stands for the number average molar mass) analyses.

The product of this example remained fluid under ambient storage temperature for about 15 days or more and was fluid for more than ten days when held at 50° C.

This product of example 2 when evaluated in ambient and heat cured waterborne surface coating applications resulted in coating films with good appearance, satisfactory resistance properties and superior formulation stability. Additionally, it has been observed that the use of the product of this example 2 provided a better resistance to heat aged film color stability of the resulting coating when compared to the use of the product of example 1. This example shows a higher conversion of bound polyol was obtained when an organic acid catalyst is used.

Example 3: Ethanedial, Resin with 2-imidazolidinone and 2-Methyl-propane-1,3-diol (GO:EU:MP Diol=1.18:1.0:0.40)

A resin according to the invention was prepared by the following procedure:

171.0 parts (1.18 moles) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 8%) to 5.9. 211.5 parts (1.00 moles) of ethylene urea (MW 86, 2-imidazolidinone solution, with a mass fraction of solute of 41.0%) were added at ambient temperature over a period of 15-30 minutes. The reaction mixture was heated to 25° C. and a mild exotherm to 35-40° C. was observed. The temperature was raised to 45-50° C. and once 50° C. was achieved water was removed at reaction temperature (50° C.) under vacuum (from 600 mmHg ramped to 100 mmHg) to a final mass fraction of solids of ~64%. After the removal of water a mass of water equivalent to the water removed in the previous step was added to return the reaction to its initial mass fraction. At the end of this time period, 36.2 parts (0.40 moles) of MP Diol were added to the reaction vessel, followed by 1.1 parts (0.0056 moles) of citric acid. The pH was measured to be in the range of 3.1-3.6. The reaction mixture was held at 50° C. for four hours under stirring. At the end of four hours the pH was adjusted to ~6.0-6.5 using aqueous sodium hydroxide solution (with a mass fraction of 25%). The heat was turned off and the reaction mixture was allowed to cool to ambient and filtered. 450 grams of a straw yellow solution of the product was isolated. The product with a dynamic viscosity of approximately 100 mPa·s and a mass fraction of solids of 43.2% was obtained.

The amount of reacted MP diol of the resulting yellow crosslinker solution (~450 g) was determined by C-13 NMR to be (n(-diol)/n(EU)=0.20 mol/mol; "EU" stands for ethylene urea; the amount of unreacted MP diol to be (n(-diol)/n(EU)=0.17 mol/mol.

This sample was fluid after a period of six months under ambient storage conditions.

Example 4: Ethanedial, Resin with 2-imidazolidinone and 2-Methyl-propane-1,3-diol (GO:EU:MP diol=1.19:1.0:0.40).

A resin according to the invention was prepared by the following procedure:

8585.6 parts (59.2 moles) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 8%) to 6.2. 9000.8 parts (49.8 moles) of ethylene urea (MW 86, 2-imidazolidinone solution, with a mass fraction of solute of 47.7%) were added at ambient temperature over a period of 15-30 minutes. The reaction mixture was heated to 25° C. and a mild exotherm to 35-40° C. was observed. The temperature was raised to 45-50° C. and held for one hour. At the end of this hold period, 1808.2 parts (20.06 moles) of MP Diol were added to the reaction vessel, followed by 48.2 parts (0.251 moles) of citric acid. The pH was measured to be in the range of 3.1-3.6. The reaction mixture was held at 50° C. for four hours under stirring. At the end of four hours the pH was adjusted to ~6.0-6.5 using aqueous sodium hydroxide solution (with a mass fraction of 25%). The heat was turned off and the reaction mixture was allowed to cool to ambient and filtered. A straw yellow solution of the product was isolated having a dynamic viscosity of approximately 100 mPa·s and a mass fraction of solids of 42.0% were obtained.

The amount of reacted MP diol of the resulting yellow crosslinker solution (~19,800 grams) was determined by C-13 NMR to be (n(-diol)/n(EU)=0.22 mol/mol; "EU" stands for ethylene urea; the amount of unreacted MP diol to be (n(-diol)/n(EU)=0.15 mol/mol.

Example 5: Ethanedial, Resin with 2-imidazolidinone and 2-ethyl-2-hydroxymethyl-1,3-propanediol (GO:EU:2-ethyl-2-hydroxymethyl-1,3-propanediol=1.18:1.0:0.17

This is an example using a triol, 2-ethyl-2-hydroxymethyl-1,3-propanediol (TMP) as the polyol.

A resin according to the invention was prepared by the following procedure:

38.8 parts (0.267 moles) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 8%) to 6.2. 41.0 parts (0.226 moles) of ethylene urea (MW 86, 2-imidazolidinone solution, with a mass fraction of solute of 47.5%) were added at ambient temperature over a period of 15-30 minutes. The reaction mixture was heated to 25° C. and a mild exotherm to 35-40° C. was observed. The temperature was raised to 45-50° C. and held for one hour. At the end of this hold period, 5.0 parts (0.0375 moles) of TMP were added to the reaction vessel, followed by 0.22 parts (0.001146 moles) of citric acid. The pH was measured to be in the range of 3.1-3.6. The reaction mixture was held at 50° C. for four hours under stirring. At the end of four hours the pH was adjusted to ~6.0-6.5 using aqueous sodium hydroxide solution (with a mass fraction of 25%). The heat was turned off and the reaction mixture was allowed to cool to ambient and filtered. A straw yellow solution of the product was isolated having a dynamic viscosity of approximately 300 mPa·s and a mass fraction of solids of 48.3% were obtained.

The amount of reacted TMP of the resulting yellow crosslinker solution (~86 grams) were determined by C-13 NMR to be (n(-diol)/n(EU)=0.08 mol/mol; "EU" stands for ethylene urea; the amount of unreacted TMP to be (n(-diol)/n(EU)=0.07 mol/mol.

Example 6: Ethanedial, Resin with
2-imidazolidinone with 1,6-hexanediol (GO:EU:hexanediol=1.18:1.0:0.39)

This is an example using a diol such as hexanediol (HD)

A resin according to the invention was prepared by the following procedure:

172.55 parts (1.19 moles) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 8%) to 6.2. 212.32 parts (1.01 moles) of ethylene urea (MW 86, 2-imidazolidinone solution, with a mass fraction of solute of 41.0%) were added at ambient temperature over a period of 15-30 minutes. The reaction mixture was heated to 25° C. and a mild exotherm to 35-40 C was observed. The temperature was raised to 45-50° C. and once 50° C. was achieved water was removed at reaction temperature (50 C) under vacuum (from 600 mmHg ramped to 220 mmHg) to a final mass fraction of solids of ~64%. After the removal of water a mass of water equivalent to the water removed in the previous step was added to return the reaction to its initial mass fraction. At the end of this time period, 47.0 parts (0.40 moles) of 1,6-Hexanediol were added to the reaction vessel, followed by 1.04 parts (0.0054 moles) of citric acid. The pH was measured to be in the range of 3.1-3.6. The reaction mixture was held at 50° C. for four hours under stirring. At the end of four hours the pH was adjusted to ~6.0-6.5 using aqueous sodium hydroxide solution (with a mass fraction of 25%). The heat was turned off and the reaction mixture was allowed to cool to ambient and filtered. A straw yellow solution of the non-alkylated product was isolated having a mass fraction of solids of 43.7%.

The product of this example 7 remained fluid for less than 8 days.

Example 7: Ethanedial, Resin with
2-imidazolidinone with 2-methyl-1,3-propanediol (GO:EU:MP diol=1.18:1.0:0.40)

This example illustrates use of succinic acid for the process.

A resin according to the invention was prepared by the following procedure:

350 parts (2.41 moles) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 8%) to 6.2. 372 parts (2.05 moles) of ethylene urea (MW 86, 2-imidazolidinone solution, with a mass fraction of solute of 47.5%) were added at ambient temperature over a period of 15-30 minutes. The reaction mixture was heated to 25° C. and a mild exotherm to 35-40° C. was observed. The temperature was raised to 45-50° C. and once 50 C was achieved water was removed at reaction temperature (50° C.) under vacuum (from 600 mmHg ramped to 140 mmHg) to a final mass fraction of solids of ~55%. After the removal of water a mass of water equivalent to the water removed in the previous step was added to return the reaction to its initial mass fraction. At the end of this time period, 74 parts (0.82 moles) of MP Diol were added to the reaction vessel, followed by 3.89 parts (0.0330 moles) of succinic acid. The pH was measured to be in the range of 3.1-3.6. The reaction mixture was held at 50° C. for four hours under stirring. At the end of four hours the pH was adjusted to ~6.0-6.5 using aqueous sodium hydroxide solution (with a mass fraction of 25%). The heat was turned off and the reaction mixture was allowed to cool to ambient and filtered. A straw yellow solution of the product was isolated having a dynamic viscosity of approximately 300 mPa·s and a mass fraction of solids of 41.0% were obtained.

The amount of reacted MP diol of the resulting yellow crosslinker solution (~810 grams) was determined by C-13 NMR to be (n(-diol)/n(EU)=0.21 mol/mol; "EU" stands for ethylene urea; the amount of unreacted MP diol to be (n(-diol)/n(EU)=0.20 mol/mol.

The product of this example remained fluid under ambient storage temperature for about 9 months or more.

This product when evaluated in ambient and heat cured waterborne surface coating applications resulted in coating films with good appearance and satisfactory resistance properties.

Example 8: Ethanedial, Resin with
2-imidazolidinone with 2-methyl-1,3-propanediol (GO:EU:MP diol=1.15:1.0:0.39)

This example illustrates use of lactic acid for the process.

A resin according to the invention was prepared by the following procedure:

165.9 parts (1.14 moles) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 8%) to 6.2. 179.9 parts (0.99 moles) of ethylene urea (MW 86, 2-imidazolidinone solution, with a mass fraction of solute of 47.5%) were added at ambient temperature over a period of 15-30 minutes. The reaction mixture was heated to 25° C. and a mild exotherm to 35-40 C was observed. The temperature was raised to 45-50° C. and once 50° C. was achieved water was removed at reaction temperature (50° C.) under vacuum (from 600 mmHg ramped to 140 mmHg) to a final mass fraction of solids of ~56%. After the removal of water a mass of water equivalent to the water removed in the previous step was added to return the reaction to its initial mass fraction. At the end of this time period, 35.1 parts (0.39 moles) of MP Diol were added to the reaction vessel, followed by 1.46 parts (0.0162 moles) of lactic acid. The pH was measured to be in the range of 3.1-3.6. The reaction mixture was held at 50° C. for four hours under stirring. At the end of four hours the pH was adjusted to ~6.0-6.5 using aqueous sodium hydroxide solution (with a mass fraction of 25%). The heat was turned off and the reaction mixture was allowed to cool to ambient and filtered. A straw yellow solution of the non-alkylated product was isolated having a dynamic viscosity of approximately 627 mPa·s and a mass fraction of solids of 45.2% were obtained.

The amount of reacted MP diol of the resulting yellow crosslinker solution (~388 g) was determined by C-13 NMR to be (n(-diol)/n(EU)=0.28 mol/mol; "EU" stands for ethylene urea; the amount of unreacted MP diol to be (n(-diol)/n(EU)=0.13 mol/mol.

This product when evaluated in ambient and heat cured waterborne surface coating applications resulted in coating films with good appearance and satisfactory resistance properties.

Example 9: Ethanedial, Resin with 2-imidazolidinone with 2-methyl-1,3-propanediol (GO:EU:MP diol=1.18:1.0:0.40) using an inorganic acid, sulfuric acid as the acid catalyst.

A resin according to the invention was prepared by the following procedure:

190.3 parts (1.31 moles) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 8%) to 6.2. 200.7 parts (1.11 moles) of ethylene urea (MW 86, 2-imidazolidinone solution, with a mass fraction of solute of 47.7%) were added at ambient temperature over a period of 15-30 minutes. The reaction mixture was heated to 25° C. and a mild exotherm to 35-40° C. was observed. The temperature was raised to 45-50° C. and held for one hour. At the end of this hold period, 40.2 parts (0.45 moles) of MP Diol were added to the reaction vessel, followed by 0.2 parts (0.0018 moles) of sulfuric acid. The pH was measured to be in the range of 3.0-3.6. The reaction mixture was held at 50° C. for four hours under stirring. At the end of four hours the pH was adjusted to ~6.0-6.5 using aqueous sodium hydroxide solution (with a mass fraction of 25%). The heat was turned off and the reaction mixture was allowed to cool to ambient and filtered. A straw yellow solution of the product was isolated.

The product of this example turned to a solid gel and was non-flowing within four days under ambient storage temperature. It has been noticed that while showing satisfying properties, the product obtained was more viscous, due to the use of an inorganic acid.

Example 10: Ethanedial, Resin with 2-imidazolidinone and 2-Methyl-propane-1,3-diol (GO:EU:MP diol molar ratio=1.18:1.00:0.40)

800.9 parts (5.52 moles) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 8%) to 5.8. 851.4 parts (4.70 moles) of ethylene urea (MW 86, 2-imidazolidinone solution, with a mass fraction of solute of 47.5%) were added at ambient temperature over a period of 15-30 minutes. The reaction mixture was heated to 25° C. and a mild exotherm to 35-40° C. was observed. The temperature was raised to 45-50° C. and held for one hour. At the end of this time period, 170.1 parts (1.89 moles) of 2-methyl-1,3-propanediol were added to the reaction vessel, followed by 4.49 parts (0.0234 moles) of citric acid. The pH was measured to be in the range of 3.1-3.6. The reaction mixture was held at 50° C. for four hours under stirring. At the end of four hours the pH was adjusted to ~6.0-6.5 using aqueous sodium hydroxide solution (with a mass fraction of solids of 25%). The heat was turned off and the reaction mixture was allowed to cool to ambient and filtered. A straw yellow solution of the product was isolated in the amount of 1850 grams. The product with a dynamic viscosity of approximately 140 mPa·s and a mass fraction of solids of 43.8% was obtained.

The amount of reacted MP diol of the resulting yellow crosslinker solution was determined by C-13 NMR to be (n(-diol)/n(EU)=0.22 mol/mol; "EU" stands for ethylene urea; the amount of unreacted MP diol to be (n(-diol)/n(EU)=0.16 mol/mol.

This product when evaluated in ambient and heat cured waterborne surface coating applications resulted in coating films with good appearance and satisfactory resistance properties.

Example 11: Ethanedial, Resin with 2-imidazolidinone and 2-Methyl-propane-1,3-diol (GO:EU:MP diol=1.18:1.0:0.40 MPD)

A resin according to the invention was prepared by the following procedure:

690 parts (4.76 moles) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 8%) to 5.9. 730 parts (4.03 moles) of ethylene urea (MW 86, 2-imidazolidinone solution, with a mass fraction of solute of 47.5%) were added at ambient temperature over a period of 15-30 minutes. The reaction mixture was heated to 25° C. and a mild exotherm to 35-40° C. was observed. The temperature was raised to 45-50° C. and once 50 C was achieved water was removed at reaction temperature (50 C) under vacuum (from 600 mmHg ramped to 100 mmHg) to a final mass fraction of solids of ~55%. After the removal of water a mass of water equivalent to the water removed in the previous step was added to return the reaction to its initial mass fraction. At the end of this time period, 145 parts (1.61 moles) of MP Diol were added to the reaction vessel, followed by 4.0 parts (0.0208 moles) of citric acid. The pH was measured to be in the range of 3.1-3.6. The reaction mixture was held at 50° C. for three and a half hours under stirring. At the end of three and a half hours the pH was adjusted to ~6.0-6.5 using aqueous sodium hydroxide solution (with a mass fraction of 25%). The heat was turned off and the reaction mixture was allowed to cool to ambient and filtered. A straw yellow solution of the product was isolated having a dynamic viscosity of approximately 100 mPa·s and a mass fraction of solids of 43.3% were obtained.

The amount of reacted MP diol of the resulting yellow crosslinker solution (~1580 grams) was determined by C-13 NMR to be (n(-diol)/n(EU)=0.25 mol/mol; "EU" stands for ethylene urea; the amount of unreacted MP diol to be (n(-diol)/n(EU)=0.18 mol/mol.

This product when evaluated in ambient and heat cured waterborne surface coating applications resulted in coating films with good appearance and satisfactory resistance properties.

Example 12: Ethanedial, Resin with
2-imidazolidinone and 2-Methyl-propane-1,3-diol (GO:EU:MP diol=1.18:1.0:0.40 MPD)
A resin according to the invention was prepared by the following procedure:

1983.1 parts (13.67 moles) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 8%) to 5.9. 2103.9 parts (11.61 moles) of ethylene urea (MW 86, 2-imidazolidinone solution, with a mass fraction of solute of 47.5%) were added at ambient temperature over a period of 15-30 minutes. The reaction mixture was heated to 25° C. and a mild exotherm to 35-40° C. was observed. The temperature was raised to 45-50° C. and once 50 C was achieved water was removed at reaction temperature (50 C) under vacuum (from 600 mmHg ramped to 100 mmHg) to a final mass fraction of solids of ~55%. After the removal of water a mass of water equivalent to the water removed in the previous step was added to return the reaction to its initial mass fraction. At the end of this time period, 420.1 parts (4.66 moles) of MP diol were added to the reaction vessel, followed by 11.25 parts (0.0586 moles) of citric acid. The pH was measured to be in the range of 3.1-3.6. The reaction mixture was held at 50° C. for three and a half hours under stirring. At the end of three and a half hours the pH was adjusted to ~6.0-6.5 using aqueous sodium hydroxide solution (with a mass fraction of 25%). The heat was turned off and the reaction mixture was allowed to cool to ambient and filtered. A straw yellow solution of the product was isolated having a dynamic viscosity of approximately 100 mPa·s and a mass fraction of solids of 41.4% were obtained.

The amount of reacted MP diol of the resulting yellow crosslinker solution (4580 grams) was determined by C-13 NMR to be (n(-diol)/n(EU)=0.24 mol/mol; "EU" stands for ethylene urea; the amount of unreacted MP diol to be (n(-diol)/n(EU)=0.16 mol/mol.

Example 13: Ethanedial, resin with
2-imidazolidinone and 2-Methyl-propane-1,3-diol (GO:EU:MP diol=1.19:1.0:0.41),
A resin according to the invention was prepared by the following procedure:

8583 parts (59.15 moles) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 8%) to 5.8. 9001 parts (49.8 moles) of ethylene urea (MW 86, 2-imidazolidinone solution, with a mass fraction of solute of 47.7%) were added at ambient temperature over a period of 15-30 minutes. The reaction mixture was heated to 25° C. and a mild exotherm to 35-40° C. was observed. The temperature was raised to 45-50° C. and held for one hour. At the end of this hold period, 1821 parts (20.21 moles) of MP Diol were added to the reaction vessel, followed by 48 parts (0.2501 moles) of citric acid. The pH was measured to be in the range of 3.1-3.6. The reaction mixture was held at 50° C. for four hours under stirring. At the end of four hours the pH was adjusted to ~6.0-6.5 using aqueous sodium hydroxide solution (with a mass fraction of 25%). The heat was turned off and the reaction mixture was allowed to cool to ambient and filtered. A straw yellow solution of the product was isolated having a dynamic viscosity of approximately 133 mPa·s and a mass fraction of solids of 42.1% were obtained.

The amount of reacted MP diol of the resulting yellow crosslinker solution (~19,800 grams) was determined by C-13 NMR to be (n(-diol)/n(EU)=0.23 mol/mol; "EU" stands for ethylene urea; the amount of unreacted MP diol to be (n(-diol)/n(EU)=0.17 mol/mol.

This product when evaluated in high temperature bake applications for use in industrial waterborne surface coating applications resulted in coating films with good appearance and satisfactory resistance properties.

Example 14: Methylated Ethanedial, Resin with
2-imidazolidinone with 2-methyl-1,3-propanediol (GO:EU:MP diol=1.18:1.0:0.40)
A resin according to the invention was further reacted with a primary hydroxy mono-functional alcohol, methanol, and illustrates the optional preparation of an etherified resin of the invention.

351.7 parts of product (EuGo-MP Diol, with a mass fraction of solute of 43.2%) from example 3 were charged to a reaction vessel at ambient temperature and 126.4 parts (3.94 moles) of methyl alcohol (MW=32.04) were added. The temperature of the mixture was then raised to 45-50 C and once 50 C was achieved 5.21 parts (0.0207 moles) of Nitric acid (MW=63.01, with a mass fraction of 25.0%) were added and the pH was measured to be in the range of 2.0-2.3. The reaction mixture was held at 50° C. for four hours under stirring. At the end of four hours the pH was adjusted to ~6.0-6.5 using aqueous sodium hydroxide solution (with a mass fraction of 25%). Approximately 485 g of straw yellow solution of the alkylated product were isolated.

The amount of reacted MP diol of the resulting yellow crosslinker solution was determined by C-13 NMR to be (n(-diol)/n(EU)=0.14 mol/mol; "EU" stands for ethylene urea; the amount of unreacted MP diol to be (n(-diol)/n(EU)=0.25 mol/mol. The degree of etherification (or amount of reacted methanol) for the product of Example 14 was determined by C-13 NMR to be (n(-methoxy)/n(EU)=1.36 mol/mol.

Example 15: Ethanedial, Resin with
2-imidazolidinone and 2-Methyl-propane-1,3-diol (GO:EU:MP diol=1.18:1.0:0.40)
A resin according to the invention was prepared by the following procedure:

801.1 parts (5.52 moles) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 8%) to 5.9. 847.4 parts (4.67 moles) of ethylene urea (MW 86, 2-imidazolidinone solution, with a mass fraction of solute of 47.5%) were added at ambient temperature over a period of 15-30 minutes. The reaction mixture was heated to 25° C. and a mild exotherm to 35-40° C. was observed. The temperature was raised to 45-50° C. and once 50° C. was achieved water was removed at reaction temperature (50° C.) under vacuum (from 600 mmHg ramped to 100 mmHg) to a final mass fraction of solids of ~55%. After the removal of water 170.6 parts (1.89 moles) of MP Diol were added to the reaction vessel, followed by 4.6 parts (0.0242 moles) of citric acid. The pH was measured to be in the range of 3.1-3.6. The reaction mixture was held at 50° C. for two hours under stirring. At the end of two hours the pH was adjusted to ~6.0-6.5 using aqueous sodium hydroxide solution (with a mass fraction of 25%). The heat was turned off and the reaction mixture was allowed to cool to ambient and filtered.

After filtration the product of this experiment H was taken and diluted with various solvents. For the first dilution, called H1, 231.2 parts of H (EuGO-MP Diol) were taken and diluted with 63.7 parts of water to create a dilute product with a mass fraction of solute of 40.2%. For the second dilution, called H2, 202.8 parts of H (EuGO-MP Diol) were taken and diluted with 55.8 parts of 1-methoxy-2-propanol to create a dilute product with a mass fraction of solute of 40.6%. It is thus possible to obtain dilute products either in water or in solvent.

Comparative Example, not According to the Invention: Non-Alkylated 2-Imidazolidinone-Ethanedial Resin (GO:EU=1.18:1.0)

A resin without the use of a polyol in the process was prepared by the following procedure:

290 parts (2 moles) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 10%) to 6.2. 161.5 parts (1.7 moles) of ethylene urea hemihydrate (MW 95, 2-imidazolidinone, solid) were added at ambient temperature over a period of 45-60 minutes. The reaction mixture was heated to 25 C and a mild exotherm to 35-40 C was observed along with a pH increase of approximately 0.55 to 1.5 pH units. The temperature was raised to 42-48 C and held for one hour. The heat was turned off and the reaction mixture was allowed to cool to ambient for 3-4 hours. A straw yellow solution of the non-alkylated product was isolated having a dynamic viscosity of approximately 570 mPa·s and a mass fraction of solids of 56.5% were obtained. The product was further diluted with 115 grams of de-ionized water to obtain a non-alkylated product with a mass fraction of solids of 45% and a dynamic viscosity of approximately 125 mPa·s.

The product of this example was fluid for less than eight days at 50° C.

Example C1: Preparation of Coating Compositions Using Crosslinker Compositions of Example 1 and Example 2

Coating compositions were prepared by using the ingredients listed in table 1 below. The acrylic emulsion EMP 9524 (corresponds to hydroxy functional acrylic resins with sulphonic acid groups incorporated in the polymer, examples of this kind of resin are described in US 2014/0243469A1) was charged to a vessel, fitted with a suitable mixing device, followed by addition of the solvent and requisite level of catalyst ("pTSA" para-toluene sulphonic acid, dissolved in water). The crosslinkers from Examples 1 and 2 (formaldehyde free crosslinker), respectively, were added along with a rheology modifying agent and additional solvent as needed and stirred to provide coating formulations with a mass fraction of solids of 40% and an overall mass ratio of binder to crosslinker of 80/20.

TABLE 1

Coating Compositions

| Coating Formulation | C1.1 | C1.2 |
|---|---|---|
| Crosslinker of Example | 1 | 2 |
| mass of Formaldehyde free (FF) crosslinker in grams | 6.40 | 6.67 |
| mass of binder | 30.62 | 30.62 |
| Rheolate 255, 20% | 0.64 | 0.64 |
| Water | 1.54 | 1.27 |
| pTSA (20% in water) | 0.80 | 0.8 |
| Total | 40.00 | 40.00 |
| Binder: | EMP 9524, OH value = 145; acid value = 25 | |
| Rheology modifier: | Rheolate 255, Elementis Specialties | |

Films were prepared by applying the coating composition of examples C1.1 and C1.2 to the surface of 101.6 mm×152.4 mm (4"×6") clean glass panels and white base coated B1000 steel panels and using a wire-wound coating bar #50 to draw down the applied formulation resulting in a uniform film. The coated panels were then allowed to flash at room temperature for either twenty-four hours at ambient conditions (20° C. to 25° C.), or for fifteen minutes at 65° C., and film properties measured twenty-four hours later. Film appearance was judged visually, where coating films denoted with "poor" had irregular surface, and coating film denoted with "good" had smooth transparent surface and no wrinkles. Film hardness was measured using BYK Gardner Pendulum Hardness Tester—König hardness (measured according to ASTM D 4366, equivalent to DIN EN ISO 1522). Heat aged yellowing delta b* is defined as heating coated white panels for two hours at 80° C. using and measuring the before and after b* value using BYK Gardner spectro guide.

The results summarized in table 2 were obtained upon ambient temperature cure (23° C.).

TABLE 2

Coating Performance

| Coating Formulation | C 1.1 | C 1.2 |
|---|---|---|
| Dry Film Thickness, mil | 2.4 | 2.4 |
| Film Appearance | good | good |
| Hardness according to Konig | 106 | 102 |
| Heat Aged Yellowing Delta b* | 2.43 | 1.7 |

The evaluation of the crosslinking compositions of the examples 1 and 2, in waterborne coatings applications in coating compositions C1.1 and C1.2, showed that these new products delivered acceptable coating performance. Furthermore, the product of example 2 made using citric acid resulted in improved heat aged film color stability with a delta b* (Ab) value of 1.7.

Example C2: Preparation of Coating Compositions Using Crosslinker Composition of Example 2

Coating formulations may also be prepared in combination with melamine-formaldehyde crosslinkers as a means to reduce overall coatings formaldehyde emissions. Formulations were prepared as listed in Table 3. A waterborne melamine formaldehyde (MF) crosslinker, CYMEL® 385 was added as 10% of crosslinker solids and compared to a formulation as described in C2.1 below. Formaldehyde free crosslinker is the crosslinker described in example 2.

TABLE 3

Coating Compositions

| Coating Formulation | C2.1 | C2.2 |
|---|---|---|
| Crosslinker of Example | 2 | 2 |
| mass of Formaldehyde free (FF) crosslinker, in g | 6.67 | 6.00 |
| mass of MF crosslinker, in g | 0.0 | 0.41 |
| mass of binder | 29.22 | 29.22 |
| Rheolate 255, 20% | 0.64 | 0.64 |
| Water | 2.67 | 2.93 |
| pTSA (20% in water) | 0.8 | 0.80 |
| Total | 40.00 | 40.00 |
| Binder: | EMP 9524, OH value = 145; acid value = 25 | |
| Rheology modifier: | Rheolate 255 Elementis Specialties | |
| MF crosslinker: | CYMEL 385 at 80% solids content | |

Films were prepared by applying the coating composition of examples C2.1 and C2.2 to the to the surface of 101.6 mm×152.4 mm (4"×6") clean glass panels and white base coated B1000 steel panels and using a wire-wound coating bar #50 to draw down the applied formulation resulting in a uniform film. The coated panels were then allowed to flash at room temperature for twenty-four hours at ambient conditions (20° C. to 25° C.).

TABLE 4

Coating Performance

| Coating Formulation | C2.1 | C2.2 |
|---|---|---|
| Dry Film Thickness, mil | 2.6 | 2.4 |
| Film Appearance | good | good |
| Hardness according to Konig | 131 | 118 |
| Heat Aged Yellowing Delta b* | 1.21 | 0.24 |

The evaluation of the crosslinking compositions of example 2 in coating composition C2.1 and example 2 in combination with a melamine formaldehyde crosslinker in coating composition C2.2 showed that these products delivered acceptable coating performance.

Example C3: Preparation of Coating Compositions Using Crosslinker Composition Product of Example 10 and Example 7

Coating compositions were prepared by using the ingredients listed in table 5 below. The acrylic emulsion EMP 9524 (corresponds to hydroxy functional acrylic resins with sulphonic acid groups incorporated in the polymer, examples of this kind of resin are described in US 2014/0243469A1) was charged to a vessel, fitted with a suitable mixing device, followed by addition of the solvent and requisite level of catalyst ("pTSA" para-toluene sulphonic acid, dissolved in water). The crosslinkers from Examples 10 and 7 respectively (FF crosslinkers), were added along with a rheology modifying agent and additional solvent as needed and stirred to provide coating formulations with a mass fraction of solids of 40% and an overall mass ratio of binder to crosslinker of 80/20.

TABLE 5

Coating Compositions

| Coating Formulation | C3.1 | C3.2 |
|---|---|---|
| Crosslinker of Example | 10 | 7 |
| mass of FF crosslinker, in g | 7.36 | 7.75 |
| mass of binder | 29.22 | 29.22 |
| Rheolate 255, 20% | 0.64 | 0.64 |
| Water | 1.98 | 1.59 |
| pTSA (20% in water) | 0.80 | 0.80 |
| Total | 40.00 | 40.00 |
| Binder: | EMP 9524, OH value = 145; acid value = 25 | |
| Rheology modifier: | Rheolate 255, Elementis Specialties | |

Films were prepared by applying the coating composition C3.1 and C3.2 to the surface of 101.6 mm×152.4 mm (4"×6") clean glass panels and white base coated B1000 steel panels and using a wire-wound coating bar #50 to draw down the applied formulation resulting in a uniform film. The coated panels were then allowed to flash at room temperature for 10 minutes followed by 15 minutes at 65° C.

TABLE 6

Coating Performance

| Coating Formulation | C3.1 | C3.2 |
|---|---|---|
| Dry Film Thickness, mil | 2.4 | 2.4 |
| Film Appearance | good | good |
| Hardness according to Konig | 180 | 179 |
| Heat Aged Yellowing Delta b* | 1.14 | 0.84 |

The evaluation of the crosslinking compositions of example 10 and 7 in coating composition C3.1 and C3.2 showed that these products delivered acceptable coating performance.

Example C4: Preparation of Coating Compositions Using Crosslinker Compositions of Example 11 and Example 8

Coating compositions were prepared by using the ingredients listed in table 7 below. The acrylic emulsion EMP 9524 (corresponds to hydroxy functional acrylic resins with sulphonic acid groups incorporated in the polymer, examples of this kind of resin are described in US 2014/0243469A1) was charged to a vessel, fitted with a suitable mixing device, followed by addition of the solvent and requisite level of catalyst ("pTSA" para-toluene sulphonic acid, dissolved in water). The crosslinkers from Examples 11 and 8, respectively (FF crosslinkers), were added along with a rheology modifying agent and additional solvent as needed and stirred to provide coating formulations with a mass fraction of solids of 40% and an overall mass ratio of binder to crosslinker of 80/20.

TABLE 7

Coating Compositions

| Coating Formulation | C4.1 | C4.2 |
|---|---|---|
| Crosslinker of Example | 11 | 8 |
| mass of crosslinker, in g | 7.39 | 7.08 |
| mass of binder | 29.22 | 29.22 |
| Rheolate 255, 20% | 0.64 | 0.64 |
| Water | 1.95 | 2.26 |
| pTSA (20% in water) | 0.80 | 0.80 |
| Total | 40.00 | 40.00 |
| Binder: | EMP 9524, OH value = 145; acid value = 25 | |
| Rheology modifier: | Rheolate 255, Elementis Specialties | |

Films were prepared by applying the coating composition C4.1 and C4.2 to the surface of 101.6 mm×152.4 mm (4"×6") clean glass panels and white base coated B1000 steel panels and using a wire-wound coating bar #50 to draw down the applied formulation resulting in a uniform film. The coated panels were then allowed to flash at room temperature for 10 minutes followed by 15 minutes at 65° C.

TABLE 8

Coating Performance

| Coating Formulation | C4.1 | C4.2 |
|---|---|---|
| Dry Film Thickness, mil | 2.6 | 2.6 |
| Film Appearance | good | good |
| Hardness according to Konig | 137 | 137 |
| Heat Aged Yellowing Delta b* | 1.23 | 1.35 |

The evaluation of the crosslinking compositions of example 11 and 8 in coating compositions C4.1 and C4.2 showed that these products delivered acceptable coating performance.

Example C5: Preparation of Coating Compositions Using Example 13

The following is an example of a coating composition which demonstrates the use of the crosslinking composition of the invention in high temperature bake applications for use in industrial coatings Coating compositions were prepared by using the ingredients listed in table 9 below. The acrylic emulsion MACRYNAL® SM 6826 was charged to a vessel, fitted with a suitable mixing device, followed by addition of the solvent. The crosslinker from Example 13 (FF crosslinker) was added along with a rheology modifying agent and additional solvent as needed and stirred to provide coating formulations with a mass fraction of solids of 40% and an overall mass ratio of binder to crosslinker of 80/20.

TABLE 9

Coating Compositions

| Coating Formulation | C5.1 |
|---|---|
| Crosslinker of Example | 13 |
| mass of FF crosslinker, in g | 7.60 |
| mass of binder | 29.77 |

TABLE 9-continued

Coating Compositions

| Coating Formulation | C5.1 |
|---|---|
| Rheolate 255, 20% | 0.64 |
| Water | 1.99 |
| Total | 40.00 |
| Binder: | Allnex, Macrynal ® SM 6826w/43WA, OH value = 145; acid value = 25 |
| Rheology modifier: | Elementis Specialties |

Films were prepared by applying the coating composition C5.1 to the surface of a 101.6 mm×152.4 mm (4"×6") clean glass panel and using a wire-wound coating bar #50 to draw down the applied formulation resulting in a uniform film. The coated panels were then allowed to flash at room temperature for 10 minutes followed by 20 minutes at 125° C.

TABLE 10

Coating Performance

| Coating Formulation | C5.1 |
|---|---|
| Film Appearance | good |
| Hardness according to Konig | 120 |

The evaluation of the crosslinking compositions of example 13 in coating composition C5.1 showed that this product delivered acceptable coating performance.

Example C6: Preparation of Coating Compositions Using Crosslinker Compositions of Example 4

Coating compositions were prepared by using the ingredients listed in table 11 below. The acrylic emulsion EMP 9524 (corresponds to hydroxy functional acrylic resins with sulphonic acid groups incorporated in the polymer, examples of this kind of resin are described in US 2014/0243469A1) was charged to a vessel, fitted with a suitable mixing device, followed by addition of the solvent and requisite level of catalyst (boric acid dissolved in water). The crosslinker from Example 4 was added along with a rheology modifying agent and additional solvent as needed and stirred to provide coating formulations with a mass fraction of solids of 40% and an overall mass ratio of binder to crosslinker of 80/20.

TABLE 11

Coating Compositions

| Coating Formulation | C6.1 | C6.2 |
|---|---|---|
| Crosslinker of Example | 4 | 4 |
| mass of crosslinker, in g | 7.62 | 7.62 |
| mass of binder | 29.22 | 29.22 |
| Rheolate 255, 20% | 0.64 | 0.64 |
| Water | 2.52 | 2.20 |
| Boric Acid (10% in water) | 0.00 | 0.32 |
| Total | 40.00 | 40.00 |
| Binder: | EMP 9524, OH value = 145; acid value = 25 | |
| Rheology modifier: | Rheolate 255, Elementis Specialties | |

Films were prepared by applying the coating composition C6.1 and C6.2 to the surface of 101.6 mm×152.4 mm (4"×6") white base coated B1000 steel panels and using a wire-wound coating bar #50 to draw down the applied formulation resulting in a uniform film. The coated panels were then allowed to cure at room temperature for 5 days.

TABLE 12

Coating Performance

| Coating Formulation | C6.1 | C6.2 |
|---|---|---|
| Dry Film Thickness, mil | 1.5 | 1.9 |
| Film Appearance | good | hazy |
| Heat Aged Yellowing Delta b* | −0.01 | −0.02 |

The evaluation of the crosslinking composition of example 4 in coating compositions C6.1 and C6.2 showed that this product delivered acceptable coating performance and low heat aged yellowing in presence of the boric acid catalyst.

The invention claimed is:

1. A process for preparing a reaction product H of at least one cyclic urea U, at least one multifunctional aldehyde A, and at least one polyol P, the process comprising the steps of:
    a) mixing the at least one cyclic urea U with the at least one multifunctional aldehyde A in order to effect an addition reaction in the presence of at least one base B, which does not react with any of the multifunctional aldehyde A, the cyclic urea U, the reaction product H, and the at least one polyol P, and then
    b) admixing the at least one polyol P together with at least one acid catalyst C to the at least one cyclic urea U, the at least one multifunctional aldehyde A and the at least one base B,
    wherein the reaction product H is obtained in the presence of the at least one acid catalyst C, and
    wherein a ratio of an amount of the at least one polyol P reacted or bound into the reaction product H to an amount of the at least one cyclic urea U in the reaction product H is at least 0.19 mol/mol.

2. The process according to claim 1, wherein the at least one acid catalyst C is an organic acid catalyst.

3. The process according to claim 1, wherein the at least one acid catalyst C is selected from the group consisting of citric acid, succinic acid, lactic acid, tartaric acid and any mixtures thereof.

4. The process according to claim 1, wherein the at least one acid catalyst C is citric acid.

5. The process according to claim 1, wherein the at least one polyol P is selected from the group consisting of ethylene glycol, diethylene glycol, 1,3-propylene glycol, 1,2-propylene glycol, butanediol, 1,6-hexanediol, 2-methyl-1,3-propanediol, 2-ethyl-1,2-hydroxymethyl-1,3-propanediol, trimethylol propane, tris (hydroxymethyl) ethane, cyclohexanedimethanol, neopentyl glycol, trimethylpentanediol, dimethylolpropionic acid, pentaerythritol and any mixtures thereof.

6. The process according to claim 1, wherein the at least one polyol P is selected from the group consisting of hexanediol, 2-methyl-1,3-propanediol (MP diol), 2-ethyl-1, 2-hydroxymethyl-1,3-propanediol, trimethylol propane (TMP), tris (hydroxymethyl) ethane (THME), cyclohexanedimethanol (CHDM), neopentyl glycol (NPG), trimethylpentanediol, dimethylolpropionic acid (DMPA) and pentaerythritol.

7. The process according to claim 1, wherein the at least one polyol P is selected from the group consisting of 2-methyl-1,3-propanediol, 2-ethyl-1,2-hydroxymethyl-1,3-propanediol, trimethylol propane and 1,6-hexanediol.

8. The process according to claim 1, wherein the polyol P is 2-methyl-1,3-propanediol.

9. The process according to claim 1, wherein the at least one cyclic urea U is selected from the group consisting of ethylene urea, 1,3-propylene urea, 1,2-propylene urea, 1,4-butylene urea, glycoluril and any mixtures thereof.

10. The process according to claim 1, wherein the at least one multifunctional aldehyde A is selected from the group consisting of glyoxal, malonic dialdehyde, succinic dialdehyde, glutaric dialdehyde and any mixtures thereof.

11. The process according to claim 1, wherein the ratio of an amount of substance of the at least one multifunctional aldehyde A to an amount of substance of the at least one cyclic urea U is comprised within the range of between 0.8:1 and 1.4:1 molar equivalents.

12. The process according to claim 1, wherein the ratio of an amount of substance of the at least one polyol P to an amount of substance of the at least one cyclic urea U is comprised within the range of between 0.01:1 and 1:1 molar equivalents.

* * * * *